United States Patent Office 2,868,756
Patented Jan. 13, 1959

2,868,756

ACRYLONITRILE-CONTAINING TERPOLYMERS, COMPOSITION THEREOF, AND TEXTILES MADE THEREFROM

Andrew T. Walter, South Charleston, W. Va., assignor to Union Carbide Corporation, a corporation of New York No Drawing. Application July 27, 1954
Serial No. 446,161

8 Claims. (Cl. 260—32.4)

This invention relates to new compositions comprising novel terpolymers of acrylonitrile, vinyl chloride and vinylidene chloride which are soluble in acetonitrile and certain other spinning solvents, and to a novel process for their production. The invention also embraces the production of such terpolymers, and the manufacture from solutions of the terpolymers in volatile solvents boiling well below 100° C. of valuable filaments, fibers, yarns, monofils, and other textile articles, as well as films, sheets, and other shaped articles. The solutions can be used at elevated temperatures as coating, impregnating, sizing and adhesive compositions.

One of the principal objects of the invention is to provide solutions of resinous terpolymers of acrylonitrile, vinyl chloride and vinylidene chloride which are clear and homogeneous at temperatures below 100° C., and from which the solvent can be removed under commercially practicable conditions without objectionable discoloration or other injury to the resin article. Another object is to provide a solution of such a resin in a volatile solvent capable of being removed in principal part from filaments, yarns and other shaped articles made from solutions of the resin in such solvent under conditions preserving the important physical and chemical properties of the resin article. Another object is the production, from such solutions of the resins, of stretched filaments, fibers, yarns, films and the like that are substantially free from solvents for said resin boiling above 100° C., and which have good dimensional stability at temperatures up to around 200° C. Still another object is the production of solutions containing up to 30-35% of total solids which do not gel rapidly when cooled and thus minimize handling problems and yet which are readily spun to yield filaments and yarns having tenacities of around 2 to 5 or more grams per denier and ultimate elongation commonly of 8% to 40%.

Copolymers of acrylonitrile and vinylidene chloride containing 60% to 70% or more of acrylonitrile are not dissolved by acetonitrile or other commercially practicable volatile solvent boiling below 100° C. On the other hand, copolymers of acrylonitrile and vinyl chloride containing up to about 75% of acrylonitrile are soluble in acetonitrile above 60° C. However, spinning solutions of such copolymers gel quickly (usually within an hour) after the temperature is reduced below 60° C. On prolonged standing a phase separation usually occurs between gel and solvent, and a homogeneous redispersion of the resin is often difficult or impossible. The terpolymers of this invention possess the surprising property that the solvated resin solutions can be held at room temperature for as long as 24 hours before gelation is initiated.

It has been proposed to make shaped articles from terpolymers containing in the molecule 78-82% of acrylonitrile, about 3-7% of vinylidene chloride, and about 15% of vinyl chloride by forming solutions of such terpolymers in nitromethane or nitroethane, and coagulating the terpolymers into shaped articles in a bath essentially comprising an aromatic hydrocarbon solvent for the nitroalkane. The nitroethanes and other higher boiling solvents for acrylic fibers are more difficult to remove completely from the fibers or other shaped article than a solvent boiling below 100° C., such as acetonitrile. Furthermore, the nitroalkanes, being largely insoluble in water, require the use as a precipitant for the resin article of an aromatic water-insoluble high boiling solvent for the nitroalkane which later must be removed with the nitroalkane at relatively high temperatures thereby presenting certain hazards.

The present invention is based in important part upon the discovery that terpolymers of acrylonitrile, vinylidene chloride and vinyl chloride containing in the polymer between around 60% and around 75% of acrylonitrile, between around 10% and around 30% of vinyl chloride, and between around 5% and around 20% of vinylidene chloride—with vinyl chloride-vinylidene chloride weight ratios in the range from 0.5 to 5.0—and having average molecular weights such that the terpolymers having specific viscosities within the range from 0.1 to 0.6 are readily soluble in acetonitrile at temperatures around 60° C. to 110° C., and that filaments, fibers, films and other shaped articles can be formed from such solutions by coagulating the resin of the shaped article in water or an aqueous solution which may contain up to 40% of acetonitrile, but preferably from 5% to 20% thereof. The resultant articles, from which approximately all of the acetonitrile has been removed, can be converted by known stretching and annealing procedures into strong, tough filiments, fibers, yarns and the like having high softening points and strain-release temperatures, and capable of withstanding substantially higher service temperatures than similar articles made from acetone-soluble copolymers of acrylonitrile and vinyl chloride or of acrylonitrile and vinylidene chloride.

The novel terpolymers of this invention also are soluble in many solvents which boil above 100° C., such as dimethylformamide, dimethylacetamide, and ethylene carbonate, any of which can be used to dissolve and spin the terpolymers. However, acetonitrile, a water-soluble solvent boiling at 82° C., has outstanding advantages in commercial practice as a solvent for these resins.

Those terpolymers having especial utility for the production of commercially useful spun filaments and yarns contain in the polymer from around 60% to around 75% of acrylonitrile, from around 10% to 30% of vinyl chloride and from about 5% to 20% of vinylidene chloride, the sum of the three components being 100%. The average molecular weight of these terpolymers are such they have specific viscosities of between 0.1 and 0.5, the latter varying inversely with the acrylonitrile content of the terpolymer. Those terpolymers having acrylonitrile contents above about 72% preferably have specific viscosities of 0.35 or less. The specific viscosities referred to herein are determined at 20° C., using an Ostwald viscosimeter, in accordance with the formula $$\text{Sp. Vis.} = \frac{\text{Viscosity of a solution of 0.1 gram, of resin in 50 cc. of dimethylformamide}}{\text{Viscosity of dimethylformamide}} - 1$$

The specific viscosity of the resin is a direct function of its average molecular weight.

Thus, those terpolymer resins having acrylonitrile contents above around 72% and having specific viscosities of 0.35 or less are completely acetonitrile soluble at 60° C., whereas those acetonitrile-soluble terpolymer resins having acrylonitrile contents of from about 60% to about 70% can have specific viscosities up to 0.6.

The acrylonitrile-vinyl chloride-vinylidene chloride terpolymer resins of the invention are readily made by any of the usual polymerization processes employing peroxytype catalysts. It is preferred to conduct the polymerization in aqueous emulsion, in making which it is customary to use emulsifying and wetting agents such as the esters of sulfonated dicarboxylic acids and the water soluble salts of alkylated naphthalene sulfonic acids. The polymerization can be conducted at room temperature, but temperatures around 35° to 55° C. are preferred. The polymerization is accelerated by the use of the usual polymerization catalysts, such as the alkali metal persulfates and the organic peroxides, e. g., benzoyl peroxide. If desired 0.2% to 1% or more of a higher tertiary aliphatic mercaptan such as tert. dodecyl mercaptan, may be present to assist in regulating the molecular weight of the resin.

A constant ratio of the monomers preferably is maintained in the reaction mixture throughout the polymerization by suitable additions of the various monomers as required.

Dissolution of the resin preferably is effected by heating a mixture of the finely divided resin and acetonitrile in a pressure-tight container at temperatures within the range between 50° C. and 110° C., and preferably between around 60° and 100° C. whereby solvation of the resin is effected, usually within a few minutes.

Spinning solutions of these resins possess the surprising and valuable property of low temperature stability, and often remain in solution form at room temperature for as long as 24 hours before gelation of the resins occurs.

If desired the acetonitrile solutions of the invention may have incorporated therein a small amount, e. g., about 0.25% or more of the weight of the resin, of a compound stabilizing the resin against decomposition by heat or by light. Suitable compounds are the organic metallic tin and lead salts of carboxylic acids, such as dibutyl tin dimaleate. Such stabilizers are disclosed in the United States Patents Nos. 2,267,778 and 2,307,092 of V. Yngve, and United States Patent No. 2,307,157 of Quattlebaum et al.

Filaments, fibers and yarns can be spun from these acetonitrile or other solutions at solution temperatures from around 50° C. to around 80° C. by either the wet- or dry-spinning procedures. Excess solvent is removed from the shaped filaments by passing the latter through a current of air heated to 100° C.–200° C., or by immersing the filaments in water or an equivalent non-solvent for the resin which is a solvent for the acetonitrile or other spinning solvent. The water can contain up to 40% but preferably from 5% to 20% of acetonitrile to control the rate of solvent removal from the filaments. Generally the yarns or filaments are stretched from 100% to 1000% or more, at temperatures around 120° C. to 180° C. or higher, to improve their physical properties.

The stretched filaments and yarns of the terpolymer resins thus made preferably are exposed for brief periods of time to temperatures within the range between 150° C. and 250° C., while under tension permitting controlled shrinkage of from 5% to 30% or more of the stretched length, and then can withstand service temperatures as high as 150° C.–200° C. without objectionably high shrinkage.

The filaments, fibers multi-filament yarns, and films made from acetonitrile solutions of these terpolymer resins have good wet- and dry-tensile strengths and elongations, and good flexibility, elasticity, resilience and resistance to water and various chemical agents including acids and dilute alkalies, and to bacterial and fungal growths. The stretched and annealed or unannealed filaments and yarns have wet tenacities upwards of 2 to 5 or more grams per denier and wet elongations of from around 8% to 40%. The stretched and heat-treated filaments and yarns commonly have shrinkages of less than 5% in oil at 150° C.

In the accompanying examples, which serve to illustrate the invention, all parts are given in terms of weight unless otherwise indicated.

*Example 1*

To a stainless steel autoclave having an agitator were introduced 400 parts of water, 0.03 part of sodium bisulfite, and a mixture of 31.5 parts of acrylonitrile, 5 parts of vinylidene chloride, 0.9 part of mixed tertiary mercaptans of 8, 10, and 12-carbon olefins, and 0.5 part of sodium dioctyl sulfosuccinate. After heating the mixture to 45° C., 63.5 parts of vinyl chloride and 0.5 part of potassium persulfate dissolved in water were added to form the charge. The temperature was maintained at 45° C. with agitation during 19.5 hours, during which a total of 58 parts of acrylonitrile, 8.7 parts of vinylidene chloride, 1.35 parts of the said sulfosuccinate and 0.9 part of mixed tertiary mercaptans dissolved in 1.2 parts of isopropanol were added, the acrylonitrile and vinylidene chloride being added in successive amounts maintaining the ratio of acrylonitrile, vinyl chloride and vinylidene chloride approximately uniform. After 19½ hours, the reaction had proceeded to 63% conversion and a total solids content of 20.8%. The unreacted vinyl chloride was vented to the air, the temperature reduced to about 30° C., and the resulting latex was added to 1200 parts of water containing 1.5 parts of calcium chloride and heated to 112° C. under pressure with agitation. The coagulated polymer was centrifuged, washed with water, and dried at 65° C. The dry resin analyzed 66.7% acrylonitrile, 22.3% vinyl chloride, and 10.9% vinylidene chloride, and had a specific viscosity at 20° C. in dimethylformamide of 0.24. It was insoluble in acetone, but soluble in commercial acetonitrile at 50° C. in concentrations of from 10% to 30% or higher.

A quantity of the resin was slurried in acetonitrile containing 2% of dioctyl tin maleate, based on the weight of the resin, and heated with agitation to 100° C. to produce a good spinning solution of 25% resin content. This solution was filtered and metered to a spineret maintained at 70° C. and containing 40 orifices each 0.16 mm. in diameter. The filaments were hardened by passing through a coagulating bath of water containing about 10% of acetonitrile held at 70° C., and then were wound onto a bobbin. The yarn was aged for 3 hours at 80° C., and two ends were twisted together and stretched 1000% in a stretching tube held at 121° C. The stretched yarn then was annealed by exposing it for about 4.8 seconds to a temperature of 200° C. while being allowed to shrink 20% by shrinkage control. The resulting 248-denier, 80-filament yarn had a dry tenacity of 2.56 grams per denier; an elongation of 19%; a shrinkage in boiling water of 0.9%; and a shrinkage in oil at 150° C. and 200° C., respectively, of 2.5% and 13%.

*Example 2*

Following the procedure described in Example 1 with the exception that 32 parts of acrylonitrile, 63 parts of vinyl chloride and 5 parts of vinylidine chloride were used in the initial charge, and a total of 59 parts of acrylonitrile and 23 parts of vinylidene chloride were added in successive amounts during the run to maintain a uniform monomer mixture, a 32 hour run yielded a 67% conversion to polymer. The latter was coagulated, washed, and dried as described in Example 1, and analyzed 62.1% acrylonitrile, 23.2% vinyl chloride and 14.8% vinylidene chloride, and had a specific viscosity of 0.38 in dimethylformamide at 20° C.

1000 grams of this resin was slurried in 3000 grams of acetonitrile, and the slurry was heated with agitation to 85° C. to produce a spinning solution. This solution was filtered at 85° C. under pressure and then metered to the spinneret described in Example 1. The fiber was precipitated in water at about 70° C. containing 10% of acetonitrile, collected on a bobbin and dried for 3 hours at 80° C. Two ends of this yarn were stretched at 133° C. in a stretching tube and then were twisted. A portion of the twisted yarn was wound onto a collapsible package and heated for 6 hours at 110° C. during which 10.9% shrinkage occurred. The resultant 222-denier, 80-filament yarn had a tenacity of 4.62 grams per denier and an ultimate elongation of 15.5%. The yarn shrank only 1.5% after 30 minutes in boiling water, and shrank only 3% and 11%, respectively, after 15 minutes immersion in oil heated at 150° C. and at 200° C. Another portion of the same stretched yarn was annealed continuously at 180° C. in the manner described in Example 1. The annealed yarn had a denier of 246, a dry tenacity of 4.43 grams per denier, and an ultimate elongation of 18%. It shrank only 2% after 30 minutes immersion in boiling water, and 2% and 8.5% after 15 minutes immersion in 150° C. and 200° C. oil, respectively.

Example 3

Following the polymerization procedure described in Example 1, with the exception that 36 parts of acrylonitrile, 4 parts of vinylidene chloride, 60 parts of vinyl chloride and 1.8 parts of mixed tertiary mercaptans were used in the initial charge, and a total of 73 parts of acrylonitrile and 10 parts of vinylidene chloride were added during the polymerization to maintain a uniform monomer ratio in the mixture, a 21 hours reaction gave an overall conversion of 72.5%. The polymer was coagulated, washed, and dried as described in Example 1, and analyzed 67.2% acrylonitrile, 20.7% vinyl chloride, and 12.1% vinylidene chloride, and had a specific viscosity of 0.27 in dimethylformamide at 20° C.

A quantity of this polymer was slurried at room temperature in acetonitrile containing 4% of diglycidyl ether of diphenylol propane, based upon the weight of the resin, and was heated with agitation to 85° C. to produce a spinning solution containing approximately 35% of resin by weight. The yarn was spun therefrom in the manner described in Example 1 and, after stretching the yarn 1000% at 132° C. and annealing the stretched yarn continuously by heating at 200° C. for 4.8 seconds while permitting 20% shrinkage, the resultant 361-denier, 80-filament yarn had a tenacity of 4.15 grams per denier and an ultimate elongation of 20%. It had a shrinkage of 2.2% in boiling water, and shrinkages of 1.9% and 3.6% in 150° C. oil and 200° C. oil, respectively. The yarn had a light amber color and was receptive to acetate-type dyes.

Example 4

Following the polymerization procedure described in Example 1, with the exception that 45 parts of acrylonitrile, 50 parts of vinyl chloride, 5 parts of vinylidene chloride, and 1.8 parts of the mixed tertiary mercaptans were present in the initial charge, and a total of 89 parts of acrylonitrile and 15.3 parts of vinylidene chloride were added during the run to maintain a uniform monomer composition, an overall conversion of 62% was secured during 16.25 hours. The polymer, after coagulation, washing and drying as described in Example 1, analyzed 70.6% acrylonitrile, 17.3% vinyl chloride and 12.1% vinylidene chloride. It had a specific viscosity of 0.30 in dimethylformamide at 20° C.

500 grams of this resin was slurried at room temperature in acetonitrile containing 10 grams of dioctyl tin maleate stabilizer and was heated to 95° C. with agitation to produce a spinning solution of about 25% polymer concentration. Yarn was spun therefrom in the manner described in Example 1 and, after stretching the yarn 1000% at 135° C. and subsequently annealing the stretched yarn continuously at 220° C., the resultant 261-denier, 80-filament yarn had a tenacity of 4.78 grams per denier, an ultimate elongation of 19%, a 1% shrinkage after 30 minutes in boiling water, a 1% shrinkage after 15 minutes in 150° C. oil and 3% shrinkage after 15 minutes in 200° C. oil.

Example 5

Following the polymerization procedure described in Example 1, with the exception that 45 parts of acrylonitrile, 50 parts of vinyl chloride, 5 parts of vinylidene chloride, and 2.6 parts of the mixed tertiary mercaptans were present in the initial charge rather than the amounts thereof previously stated, and a total of 70 parts of acrylonitrile and 12 parts of vinylidene chloride were added during the run to maintain an approximate uniform monomer ratio, a 70% conversion to the polymer was effected after 10 hours. The polymer after coagulation, washing and drying, as described in Example 1, analyzed 71.2% acrylonitrile, 17.6% vinyl chloride and 11.2% vinylidene chloride, and had a specific viscosity of 0.28 in dimethylformamide at 20° C.

A spinning solution containing about 30% of the polymer was made by slurrying 1286 grams of the polymer at room temperature in 3000 grams of acetonitrile containing 25.7 grams of dioctyl tin maleate stabilizer, and heating the mixture to 85° C. with agitation. Yarns were spun from this solution in the manner described in Example 1 and, after stretching 1000% at a temperature of 135° C., and annealing the stretched yarn continuously at 240° C. yielded a 308-denier, 80-filament yarn with a tenacity of 3.83 grams per denier, an ultimate elongation of 14.5%, a 1% shrinkage after 30 minutes in boiling water, a 1% shrinkage after 15 minutes in 150° C. oil, and 2.5% shrinkage after 15 minutes in 200° C. oil.

Example 6

270 parts of water and 0.14 part of sodium bisulfite were charged to a stainless steel autoclave equipped with an agitator and brought to 50° C. Vinyl chloride was added to bring the autoclave pressure to 35 p. s. i., whereupon 0.365 part of potassium persulfate was introduced. A total amount of 62.6 parts of acrylonitrile, 11.2 parts of vinylidene chloride, 19.6 parts of vinyl chloride, 0.49 part of sodium dioctyl sulfosuccinate and 0.64 part of the sodium sulfate derivative of 7-ethyl-2-methylundecanol-4 were introduced in succesive amounts in a fixed ratio during the run to maintain an approximately uniform monomer ratio. After 35 hours operation at 50° C., a 90% conversion to the polymer was obtained. The polymer, after coagulation, washing and drying in the general manner described in Example 1, analyzed 67.1% acrylonitrile, 16.5% vinyl chloride and 16.4% vinylidene chloride, and had a specific viscosity of 0.48 in dimethylformamide at 20° C.

A spinning solution containing 25% of this polymer was prepared by slurrying the resin in acetonitrile containing 2% of dioctyl tin maleate, based on the weight of the resin, and heating the slurry with agitation to 90° C. in a closed container. The spinning solution was then metered to a spinneret held at 70° C. and extruded therefrom into water containing 15% of acetonitrile and held at 70° C. in the general manner described in Example 1. The coagulated filaments were withdrawn from the coagulating bath, washed with water at 85° C., and then wound onto a takeup bobbin. Two ends of this yarn were stretched 700% in steam at 124° C., and the stretched yarn then was annealed continuously by heating briefly at 170° C. under conditions permitting 20% shrinkage. The annealed 421-denier, 80-filament yarn had a tenacity of 4.33 grams per denier, an ultimate elongation of 18%, a shrinkage of 4.7% in boiling water, and a shrinkage of 7.1% in oil at 150° C.

Example 7

Following the general procedure described in Example 6, with the exception that a total of 67 parts of acrylonitrile, 12 parts of vinylidene chloride and 21 parts of vinyl chloride were introduced to the autoclave, and a total of 0.58 part of mixed tertiary mercaptans were added intermittently during the run lasting 34 hours, a terpolymer resin was made containing 66.4% of acrylonitrile, 19.8% of vinyl chloride and 13.7% of vinylidene chloride and having a specific viscosity of 0.46 in dimethylformamide at 20° C.

A 20% solution of this resin in acetonitrile containing 2% of dioctyl tin maleate stabilizer, based upon the weight of the polymer, was prepared in the general manner described in Example 6 excepting that the solvation of the resin was effected at 80° C. The solution was metered directly to a spinneret held at 70° C. such as described in Example 1, and the extruded solution was coagulated in a 70° C. water bath containing from 10% to 20% acetonitrile and was then wound onto a bobbin and dried for 3 hours at 80° C. Two ends of this yarn were stretched 1000% at 126° C., and subsequently was annealed continuously by exposure of the running yarn to a temperature of 220° C. for 4 seconds while allowing 20% shrinkage. The resultant 254-denier, 80-filament yarn had a tenacity of 4.95 grams per denier, and an ultimate elongation of 19%, a shrinkage of 2% after 30 minutes in boiling water, and shrinkages of 2.5% and 8.5% in 150° C. oil and 200° C. oil, respectively. These yarns showed marked receptivity to certain acid-type and acetate-type dyes.

*Example 8*

Following the general procedure described in Example 6, with the exception that a total of 72.6 parts of acrylonitrile, 9.8 parts of vinylidene chloride and 17.7 parts of vinyl chloride were introduced into the autoclave, and a total of 0.36 part of mixed tertiary mercaptans also were added intermittently during the run, a terpolymer resin was made containing 74.4% of acrylonitrile, 14.6% of vinyl chloride and 11.0% of vinylidene chloride, and having a specific viscosity of 0.315 at 20° C. a 92% conversion of the monomers to polymers was obtained.

A slurry of 1000 parts of this resin and 20 parts of di-2-ethylhexyl) tin dimaleate in 3000 parts of acetonitrile was heated to 75° C. to produce a spinning solution containing 25% of the resin. The solution was filtered and extruded through a 100-hole spinneret (hole size 0.10 mm.) into a water bath containing 16% of acetonitrile and held at 65° C. The coagulated filaments were withdrawn from the bath, dried, dry-stretched 600% at 175° C., and the stretched yarn was annealed at about 200° C. while allowing 16% controlled shrinkage. The resultant 279-denier, 100-filament yarn had a tenacity of 3.6 grams per denier, and an elongation of 17%. It had a 0% shrinkage in boiling water, and in air at 175° C., and only 1.5% shrinkage at 200° C.

*Example 9*

Following the general procedure described in Example 6, with the exception that a total of 70 parts of acrylonitrile, 5 parts of vinylidene chloride and 25 parts of vinyl chloride were introduced to the autoclave, and a total of 0.23 part of mixed tertiary mercaptans were added intermittently during the run, the resultant terpolymer contained 73% of acrylonitrile, 5% of vinylidene chloride and 22% of vinyl chloride, and had a specific viscosity of 0.21 at 20° C. A 98% conversion of the monomers to polymers was secured.

A slurry was made at room temperature containing 1000 parts of this resin, 20 parts of di-(2-ethylhexyl) tin maleate stabilizer and 1857 parts of acetonitrile. The slurry was heated to 90° C. to solvate the resin and yield a spinning solution containing 35% of the resin. This solution was filtered and extruded through the spinneret recited in Example 8 and into a water bath containing 10% of acetonitrile and held at 65° C. The coagulated filaments were collected and withdrawn from the bath, dried, dry-stretched 500% at 175° C., and the stretched yarn was annealed at about 200° C. while allowing 16% shrinkage. The resultant 313-denier, 100-filament yarn had a tenacity of 3.2 grams per denier and an elongation of 19%. It had good dimensional stability as evidenced by a shrinkage of 1% in boiling water; and shrinkages of 1% and 2% in air at 150° C. and at 200° C., respectively.

By the practice of the present invention it has been possible to produce terpolymers of acrylonitrile, vinyl chloride, and vinylidene chloride from which, by known dry-spinning and wet-spinning processes, filaments, fibers and yarns can be produced that are dimensionally stable at temperatures as high as 200° C. or higher, and yet can be produced by the use of a spinning solvent removable with comparative ease from the spun filaments and boiling below 100° C. Acetonitrile, boiling at 82° C., the preferred spinning solvent, also has the important industrial advantages of being water soluble, thus facilitating the use of an inexpensive aqueous precipitating bath from which the solvent is readily recoverable in known manner.

The invention is susceptible of modification within the scope of the appended claims.

I claim:

1. An acetonitrile-soluble terpolymer containing in the molecule between around 60% and around 75% of acrylonitrile, between around 10% and around 30% of vinyl chloride, and between around 5% and around 20% of vinylidene chloride, the sum of the copolymerized monomers being 100%, said terpolymer having a specific viscosity within the range between around 0.1 and 0.6.

2. An acetonitrile-soluble terpolymer containing in the molecule between around 60% and around 70% of acrylonitrile, between around 10% and around 30% of vinyl chloride, and between around 5% and around 20% of vinylidene chloride, the sum of the copolymerized monomers being 100%, said terpolymer having a specific viscosity within the range between around 0.1 and 0.6.

3. A composition comprising a resinous terpolymer dissolved in acetonitrile, said terpolymer having in the molecule between 60% and 75% of acrylonitrile, between 10% and 30% of vinyl chloride, and between 5% and 20% of vinylidene chloride, the sum of the copolymerized monomers equaling 100%, and said terpolymer having a specific viscosity within the range between around 0.1 and 0.6.

4. A composition comprising a resinous terpolymer dissolved in acetonitrile, said terpolymer having in the molecule between 60% and 75% of acrylonitrile, between 10% and 30% of vinyl chloride, and between 5% and 20% of vinylidene chloride, the sum of the copolymerized monomers equaling 100%, and said terpolymer having a specific viscosity within the range between around 0.1 and 0.35.

5. A stretched textile article of the class consisting of filaments, fibers and yarns composed of a resinous acetone-insoluble terpolymer containing in the molecule between around 60% and around 75% of acrylonitrile, between around 10% and around 30% of vinyl chloride, and between around 5% and around 20% of vinylidene chloride, a total of the copolymerized monomers equaling 100%, said terpolymer having a specific viscosity within the range between 0.1 and 0.60.

6. A stretched textile article of the class consisting of filaments, fibers and yarns composed of a resinous acetone-insoluble terpolymer containing in the molecule between around 60% and around 75% of acrylonitrile, between around 10% and around 30% of vinyl chloride, and between around 5% and around 20% of vinylidene chloride, the total of the copolymerized monomers equaling 100%, said terpolymer having a specific viscosity within the range between 0.1 and 0.35.

7. A stretched textile article of the class consisting of filaments, fibers and yarns composed of a resinous acetone-insoluble terpolymer containing in the molecule between around 60% and around 75% of acrylonitrile, between around 10% and around 30% of vinyl chloride, and between around 5% and around 20% of vinylidene chloride, the total of the copolymerized monomers equaling 100%, said terpolymer having a specific viscosity within the range between 0.1 and 0.6, said article being substantially free from solvents for the terpolymer boiling above 100° C.

8. A stretched textile article of the class consisting of filaments, fibers and yarns composed of a resinous acetone-insoluble terpolymer containing in the molecule between around 60% and around 75% of acrylonitrile, between around 10% and around 30% of vinyl chloride, and between around 5% and around 20% of vinylidine chloride, the total of the copolymerized monomers equaling 100%, said terpolymer having a specific viscosity within the range between 0.1 and 0.60, said article being substantially dimensionally stable at temperatures up to at least 150° C.

References Cited in the file of this patent

UNITED STATES PATENTS

| | | |
|---|---|---|
| 2,515,206 | Finzel et al. | Jan. 23, 1947 |
| 2,603,620 | Walter et al. | July 15, 1952 |
| 2,717,883 | Miller | Sept. 13, 1955 |
| 2,745,814 | Gilbert | May 15, 1956 |
| 2,761,754 | Jones | Sept. 4, 1956 |
| 2,764,468 | Hare | Sept. 25, 1956 |